United States Patent
Weissman et al.

(10) Patent No.: US 11,666,852 B1
(45) Date of Patent: Jun. 6, 2023

(54) REGENERABLE ADSORBENT SYSTEM

(71) Applicant: Precision Combustion Inc., North Haven, CT (US)

(72) Inventors: Jeffrey G. Weissman, Guilford, CT (US); Bruce Crowder, Hamden, CT (US); Richard Mastanduno, Milford, CT (US)

(73) Assignee: PRECISION COMBUSTION, INC., North Haven, CT (US)

( * ) Notice: Subject to any disclaimer, the term of this patent is extended or adjusted under 35 U.S.C. 154(b) by 406 days.

(21) Appl. No.: 17/015,796

(22) Filed: Sep. 9, 2020

Related U.S. Application Data

(60) Provisional application No. 62/904,825, filed on Sep. 24, 2019.

(51) Int. Cl.
*B01D 53/04* (2006.01)

(52) U.S. Cl.
CPC ..... *B01D 53/0438* (2013.01); *B01D 53/0431* (2013.01); *B01D 53/0446* (2013.01); *B01D 2253/102* (2013.01); *B01D 2257/406* (2013.01); *B01D 2257/504* (2013.01); *B01D 2259/40096* (2013.01)

(58) Field of Classification Search
CPC ........ B01D 53/02; B01D 53/10; B01D 53/64; B01D 53/0431; B01D 53/32; B01D 53/0454; B01J 20/3441
USPC ...... 96/153, 154, 146, 143; 95/90, 107, 148, 95/154, 134
See application file for complete search history.

(56) References Cited

U.S. PATENT DOCUMENTS

| 5,051,241 A | 9/1991 | Pfefferle |
| 6,156,444 A | 12/2000 | Smith |
| 6,328,936 B1 | 12/2001 | Roychoudhury |

(Continued)

FOREIGN PATENT DOCUMENTS

WO 2006088475 A2 8/2006

OTHER PUBLICATIONS

M. Mohamedali, D. Nath, J. Ibrahim and M. Henni in "Review of Recent Developments in CO2 Capture Using Solid Materials: Metal Organic Frameworks (MOFs)," Intech Open, Chapter 6, 2016, pp. 115-154. http://dx.doi.org/10.5772/62275.

(Continued)

*Primary Examiner* — Sharon Pregler
(74) *Attorney, Agent, or Firm* — Marie Zuckerman; Andrew D. Gathy

(57) ABSTRACT

A regenerable adsorbent system having as constituent parts: a cylindrical perforated plate defining an interior plenum, around which is wrapped at least one layer of sorbent structure supporting a sorbent; and in thermal communication with the sorbent structure is disposed an electrical resistance heater, such as, a heating cable wrapped around the sorbent structure. In one embodiment, the perforated plate includes one or more flow constrictors disposed at a downstream end of the plate. Variations include alternating sections of sorbent structure and heating cable; as well as inserting a porous insulating material to retard heat losses. The system is useful for removing a target compound, such as a contaminant VOC, ammonia, or carbon dioxide, from a fluid flowstream, such as air. When the sorbent is saturated, the system is regenerated by heating the sorbent structure via the electrical resistance heater.

21 Claims, 4 Drawing Sheets

(56) References Cited

U.S. PATENT DOCUMENTS

| | | | |
|---|---|---|---|
| 7,141,092 B1 * | 11/2006 | Roychoudhury | B01D 53/0431 |
| | | | 95/148 |
| 8,888,895 B1 | 11/2014 | Fisher | |
| 10,464,044 B1 | 11/2019 | Zoican-Loebick | |
| 2009/0139402 A1 | 6/2009 | Zhu | |
| 2018/0154334 A1 | 6/2018 | Addiego | |

OTHER PUBLICATIONS

Co-Pending unpublished U.S. Appl. No. 16/008,115, filed Jun. 14, 2018, entitled "Sorbent System for Removing Ammonia and Organic Compounds from a Gaseous Environment," Applicant: Precision Combustion, Inc.

Co-Pending unpublished U.S. Appl. No. No. 16/849,027, filed Apr. 15, 2020, entitled "Process of Removing a Metal From a Fluid Hydrocarbon," Applicant: Precision Combustion, Inc.

Co-Pending unpublished U.S. Appl. No. 16/914,693, filed Jun. 29, 2020, entitled "Process of Removing a Metal From a Fluid Hydrocarbon," Applicant: Precision Combustion, Inc.

* cited by examiner

REGENERABLE ADSORBENT SYSTEM

CROSS-REFERENCE TO RELATED APPLICATIONS

This application claims the benefit of U.S. provisional patent application No. 62/904,825, filed Sep. 24, 2019.

FIELD OF THE INVENTION

The present invention is directed to an apparatus and method for removing a target compound, such as a contaminant, from a fluid flowstream. In particular, this invention provides for an improved adsorption apparatus useful in a variety of present day applications including: removing carbon dioxide from air and combustion streams; removing noxious and hazardous volatile organic compounds (VOC's), such as formaldehyde, from air; removing ammonia from air and poultry facilities; and improving indoor air quality or the air quality in any enclosed environment, such as, an airplane, a spacecraft, a submarine or any other enclosed cabin space.

BACKGROUND OF THE INVENTION

Adsorption methods for removing a target compound from a fluid flowstream typically comprise passing the fluid flowstream over or through an adsorbent system comprising a sorbent structure. (For purposes of this invention, the target compound is also referred to as "the sorbate".) The sorbent structure may be defined by a pellet bed or by an array of tubes or plates or the like, positioned within a flow path of the fluid flowstream to be treated. The sorbent structure typically comprises or is coated with sorbent particles that adsorb one or more target compounds from the flowstream. The target compound can be one or more sorbate species.

Although such adsorbent systems are known in the art, these systems often exhibit shortcomings. When the sorbent becomes saturated with the target compound, the sorbent must be removed and replaced with fresh sorbent, or alternatively if possible, regenerated for reuse. Often, the entire saturated sorbent structure is simply removed and replaced. Preferably, the sorbent structure is regenerable on being subjected to a desorption process, which most often comprises subjecting the saturated sorbent structure to an elevated temperature or reduced pressure, after which the regenerated sorbent structure is capable of being re-exposed to the fluid flowstream containing the target compound. Use of an elevated temperature for regeneration purposes requires an auxiliary heat source to be integrated into the adsorbent system.

Another problem associated with conventional adsorbent systems involves efficiency of the system employed. Often, the unique characteristics of the selected sorbent and target compound dictate a desired range of operating temperatures for the adsorption process, while the desorption process operates within another desirable and usually higher temperature range. Several methods are known for raising the temperature of the adsorption or desorption process including heating the fluid flowstream or the sorbent by employing an auxiliary heat source; however, a non-uniform heat distribution within the sorbent or the structure supporting the sorbent negatively impacts the efficiency of both processes. In addition, the time allowed for an auxiliary heat source to raise the temperature of the sorbent structure, and thereby raise the temperature of the sorbent and the flowstream, can negatively impact the efficiency of the process. If a narrow range of operating temperatures is required, the auxiliary heat source may require a more complicated design. Although more complex auxiliary heating systems may be capable of reaching and holding a narrow operating temperature range within a comparatively short time interval, such devices may add an unacceptable weight and cost to the adsorbent system.

U.S. Pat. No. 7,141,092 discloses an adsorbent system for regenerable adsorption of a target compound from a flowstream, for example, a flowstream of air, or a combustion product stream or any other contaminated gaseous stream. The system is constructed with a sorbent structure comprising at least one layer of an ultra-short-channel-length metal mesh capable of conducting an electrical current via electrical connections to a source of electricity. At least a portion of the metal mesh is coated with a sorbent capable of sorbing at least one target compound from the flowstream. When the sorbent is saturated or nearly saturated with the target compound, the metal mesh is heated to regenerate the sorbent by releasing the target compound to a collection area; after which the sorbent is ready for reuse.

Generally, the metal mesh sorbent structure employed in U.S. Pat. No. 7,141,092 is provided as a stack of mesh sheets with the flowstream entering one end of the stack and exiting an opposite end of the stack. Alternatively, the mesh is wound into a cylindrical coil ("jelly roll") such that the flowstream enters along an inner diameter of the coil, then flows radially outward through the coil, and exits at the outer diameter of the coil. Without additional structure, however, the electrically-conductive metal mesh cannot be resistively heated for desorption without causing a short circuit. As a consequence, a porous insulating layer is required to be disposed between each pair of metal mesh layers within the stack or is required to be rolled as a separating layer with the cylindrical metal coil, so as to avoid short circuiting during resistance heating. This insulating structure increases costs and construction problems. Moreover, when used as a resistance heater, the sorbent structure itself must be electrically conductive, while in this instance insulating materials are excluded as possible sorbent structures.

More to the point, U.S. Pat. No. 7,141,092 illustrates a hollow uniformly-perforated cylindrical plate, an interior plenum of which defines a longitudinal feed channel for a flowstream containing a contaminant. The exterior of the uniformly-perforated plate provides a support for a metal mesh sorbent structure coated with sorbent. The uniformly-perforated cylindrical plate may not provide a sufficiently uniform flow distribution along the predominant direction of flow through the metal mesh. Instead, the bulk of the flowstream may bypass perforations at the upstream end of the cylindrical plate, while amassing at perforations at the downstream end of the cylindrical plate. Accordingly, the sorbent-coated mesh may be exposed to a non-uniform distribution of the contaminated flowstream, which may result in an uneven sorbate loading along the sorbent-coated mesh structure with consequential adsorption inefficiencies.

The present invention addresses the aforementioned problems and provides for an improved adsorbent system.

SUMMARY OF THE INVENTION

This invention provides for an improved adsorbent system for removing a target compound from a fluid flowstream, wherein the adsorbent system comprises:

(a) a perforated plate disposed in a cylindrical configuration comprising an upstream end and a downstream end and further defining an interior face and an exterior face; the interior face enclosing an interior plenum;

(b) at least one layer of a mesh sorbent structure having a sorbent supported thereon; the at least one layer of the mesh sorbent structure being disposed circumferentially around the exterior face of the perforated plate; and (c) an electrical resistance heater disposed in thermal communication with the at least one layer of mesh sorbent structure.

Generally, the downstream end of the cylindrical perforated plate is blocked or closed off, such that the fluid flowstream flows longitudinally into the interior plenum of the cylindrical perforated plate and then flows radially through the perforated plate, and then radially through the mesh sorbent structure contacting the sorbent, finally exiting the adsorbent system through an outlet flowpath.

The present invention provides for an energy efficient and regenerable adsorbent system for removing one or more target compounds from a fluid flowstream, which can be a gaseous or liquid flowstream. The system is simply constructed and cost effective, while offering rapid start-up and shut-down with acceptable temperature control, beneficially across narrow temperature ranges. Moreover, inasmuch as the electrical resistance heater is a separate and distinct component, the sorbent structure is not limited to electrically conductive materials but may now includes materials of relatively lower electrical conductivity, provided that thermal conductivity of the sorbent structure is acceptably sufficient. In one advantageous embodiment described hereinafter, the fluid flowstream is provided in a more uniform flow distribution along the longitudinal axis of the sorbent structure and thus the sorbent, thereby providing for a more uniform loading of adsorbed target compound (sorbate) on the sorbent and thereby improving overall adsorption efficiency.

DRAWINGS

DETAILED DESCRIPTION OF THE INVENTION

Figure 1:
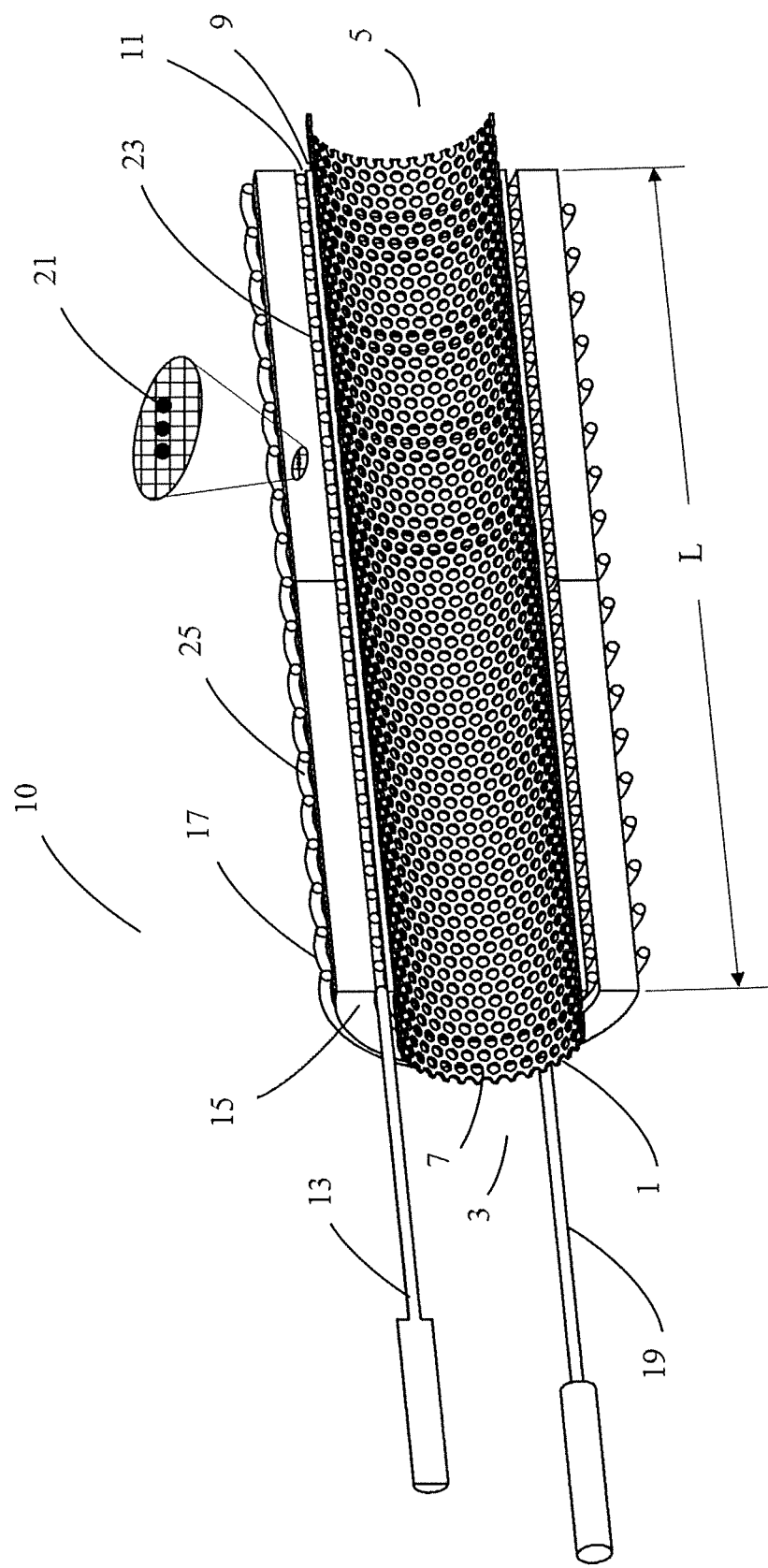
FIG. 1 depicts a longitudinal cross-sectional view of an embodiment of the regenerable adsorbent system of this invention.

In one embodiment, this invention provides for an improved adsorbent system for removing a target compound from a fluid flowstream, which may comprise a gas or a liquid; wherein the adsorbent system comprises:

(a) a non-uniformly perforated plate disposed in a cylindrical configuration comprising an upstream end and a downstream end and further defining an interior face and an exterior face; the interior face enclosing a hollow interior plenum; the non-uniformly perforated plate constructed so as to provide a greater porosity at the upstream end of the plate as compared with the downstream end of the plate;

(b) at least one layer of a mesh sorbent structure having a sorbent supported thereon; the at least one layer of the mesh sorbent structure being disposed circumferentially around the exterior face of the perforated plate; and (c) a heating cable capable of resistance heating being disposed circumferentially around the mesh sorbent structure and in spaced-apart segments sufficient to provide a flow passage for the flowstream.

In one embodiment, the adsorbent system of this invention is disposed within a housing comprising (i) an inlet for feeding the fluid flowstream containing an initial concentration of the target compound into the hollow interior plenum of the perforated plate, and (ii) an outlet pathway for passing a fluid flowstream containing a reduced concentration of the target compound from the area in and around the sorbent structure to an exterior or downstream environment.

As noted hereinbefore, the downstream end of the cylindrical perforated plate is typically closed to restrict the flowstream containing the target compound. (See FIG. 2/35.) As a consequence, the flowstream containing the target compound flowing longitudinally through the hollow plenum of the cylindrical perforated plate turns to flow radially through the perforated plate, and thereafter flows radially through the mesh sorbent structure contacting the sorbent and then past the electrical resistance heater, for example, the heating cable, into the outlet flowpath leaving the adsorbent system. The aforementioned structures are explained in greater detail hereinafter.

In one embodiment, the non-uniformly perforated plate of cylindrical configuration comprises at least one flow constrictor disposed circumferentially and along the longitudinal axis of the plate from the mid-point to the downstream end of the plate. In another embodiment, at least one flow constrictor is disposed circumferentially and along the longitudinal axis of the perforated plate and comprises at least one non-perforated band of material. Functionally, the flow constrictor or constrictors, as the case may be, retard flow at the downstream end of the perforated plate, thus forcing an increased flow through the perforations at the upstream end of the plate, which without the flow constrictor(s) would otherwise be at least partially or fully bypassed. Accordingly, the constriction facilitates a more uniform flow distribution longitudinally from the upstream end to the downstream end of the perforated plate and, consequentially, a more uniform flow distribution along the length of the sorbent structure and contact with the sorbent.

In another embodiment, the non-uniformly perforated plate comprises a plurality of perforations in decreasing diameter along the longitudinal axis from the upstream end to the downstream end of the plate. Functionally, the aforementioned non-uniform distribution of perforations restricts flow at the downstream end of the plate, while forcing an increased flow through the larger diameter perforations at the upstream end of the plate. Accordingly, the non-uniform distribution of perforations results functionally in a more uniform flow distribution longitudinally from the upstream end to the downstream end of the perforated plate and, consequentially, a more uniform flow distribution along the length of the sorbent structure and contact with the sorbent.

In another embodiment, the electrical resistance heater comprises a heating cable that is wound in a helical coil around the outer layer of the at least one layer of mesh sorbent structure, preferably, with a spacing between each turn of the coil for egress of the flowstream. In another embodiment, a first heating cable is wound in a helical coil around the exterior face of the perforated plate, thereby being disposed between the perforated plate and an inner layer of the at least one layer of mesh sorbent structure; while a second heating cable is wound in a helical coil around the outer layer of the at least one layer of mesh sorbent structure. The helical coil or coils are wound preferably such that segments of the helix are spaced-apart from adjacent segments of the helix. Functionally, the spaced-apart segments (or "spacings") allows for a fluid to flow past the helical coils of the heating cable(s) into the outlet pathway of the adsorbent system.

In yet another embodiment, a plurality of heating cables and a plurality of layers of mesh sorbent structure are alternatingly disposed, that is, distributed in alternating fashion, around the exterior face of the perforated plate.

In yet another embodiment, a porous insulating layer is disposed in between the perforated plate and any heating cable adjacent thereto, so as to reduce heat losses to the perforated plate.

The skilled person will appreciate that the perforated plate, the mesh sorbent structure, and the insulating layer are inherently porous, either by structure (e.g., having perforations, flow channels, open cells) or molecular composition (e.g., framework defining porous channels or pores), such that a fluid is capable of flowing or passing there through. Moreover, disposition of the electrical resistance heater, for example, by providing spacings between segments of the helical coil of the heating cable, allow for flow pass there through. As a consequence, the flowstream containing the target compound passes through an inlet into the hollow plenum of the cylindrical perforated plate, and then flows radially through the perforated plate, and thereafter through any optional insulating layer, and thereafter the mesh sorbent structure contacting the sorbent, finally exiting through the spaces between the electrical resistance heater, for example, the segments of the coiled heating cable, into an outlet pathway, thereby exiting the adsorbent system optionally through a final insulating layer.

In another aspect, this invention pertains to a process of regenerably removing a target compound from a fluid flowstream comprising:

(a) providing an adsorbent system comprising the following components:

(a)(i) a non-uniformly perforated plate disposed in a cylindrical configuration comprising an upstream end and a downstream end and further defining an interior face and an exterior face; the interior face enclosing a hollow interior plenum; optionally, the non-uniformly perforated plate providing for a greater porosity at the upstream end of the plate as compared with the downstream end of the plate;

(a)(ii) at least one layer of a mesh sorbent structure having a sorbent supported thereon; the at least one layer of the mesh sorbent structure being disposed circumferentially around the exterior face of the perforated plate; and (a)(iii) a heating cable capable of providing resistance heating, disposed circumferentially around and in thermal communication with the at least one layer of mesh sorbent structure, the heating cable being disposed in spaced-apart segments sufficient to provide a flow passage for the flowstream;

(b) initiating a fluid flowstream comprising a target compound into the adsorbent system and contacting the fluid flowstream with the sorbent under process conditions sufficient to remove at least in part the target compound from the flowstream;

(c) stopping the fluid flowstream when the sorbent is substantially saturated with the target compound;

(d) engaging the heating cable to heat the mesh sorbent structure and sorbent, so as to release the target compound and regenerate the sorbent; and (e) iteratively repeating steps (b) through (d).

Figure 2:
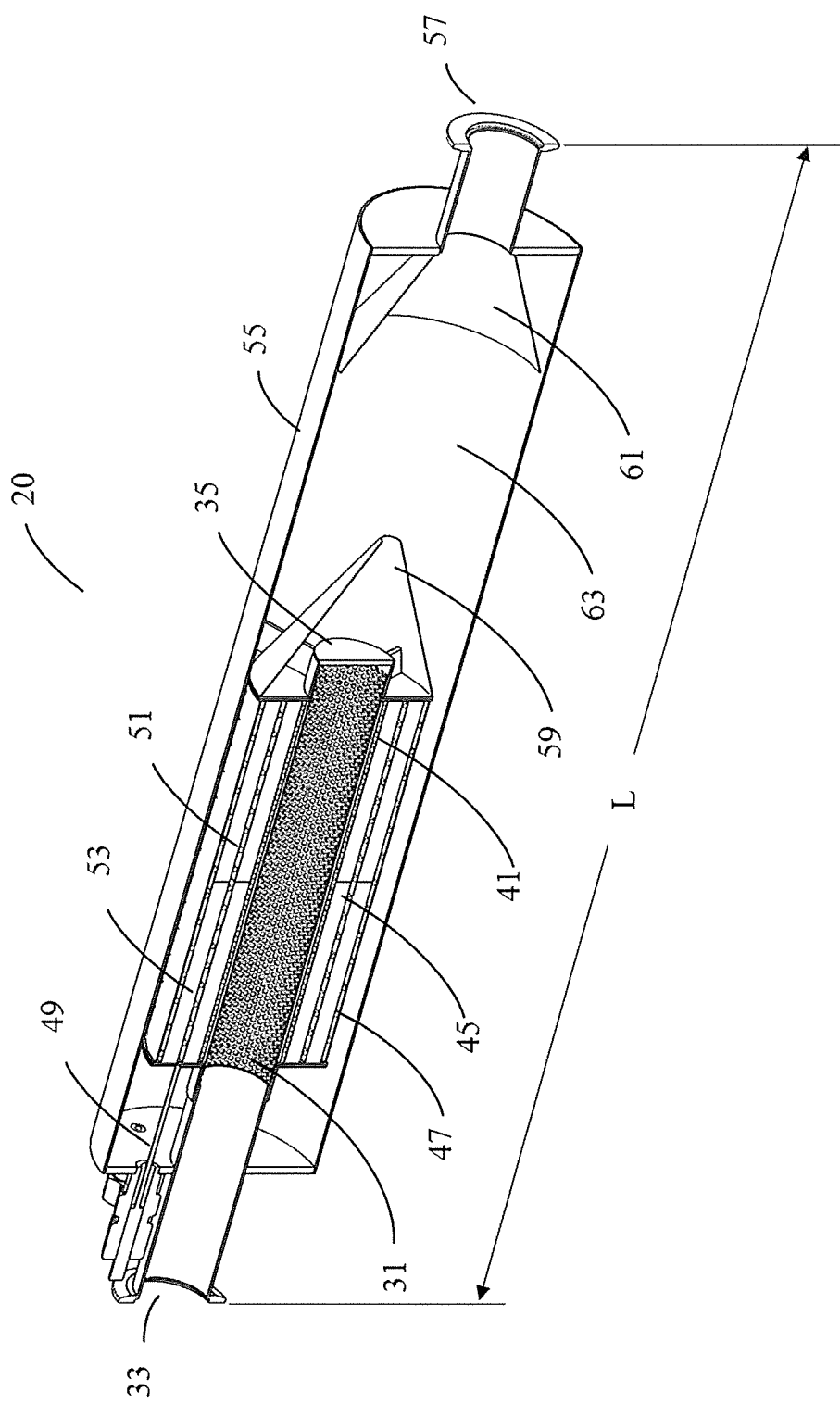
FIG. 2 depicts a longitudinal cross-sectional view of another embodiment of the regenerable adsorbent system of this invention disposed within a housing containing conical flow distributors.
Figure 3:
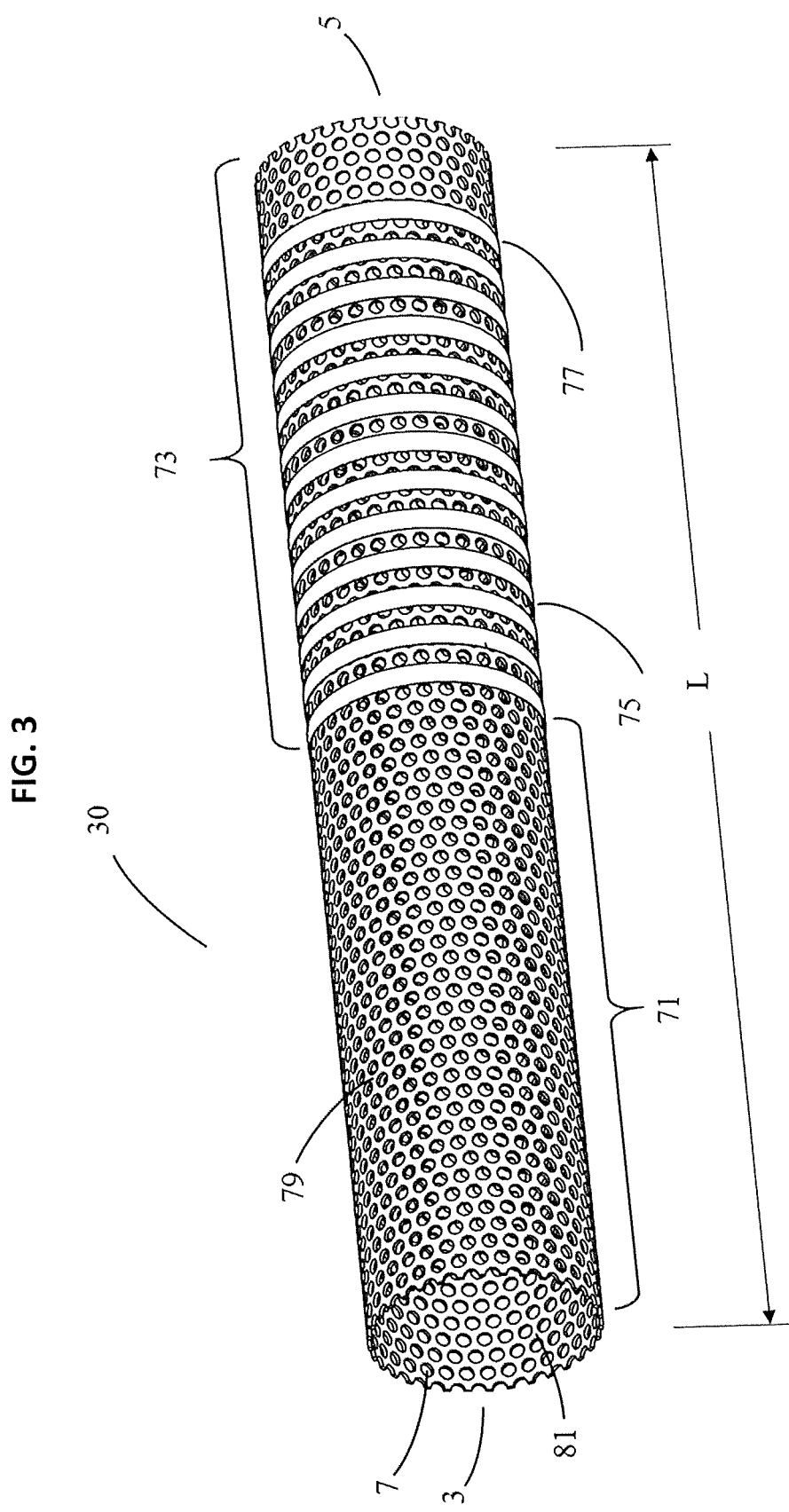
FIG. 3 depicts an isometric longitudinal view of an embodiment of the perforated plate, including flow constriction bands, of the adsorbent system of this invention.

The skilled person will appreciate the aforementioned description of the apparatus of the invention and its related operating process with reference to the specific embodiments illustrated in FIGS. 1-4. Referring first to FIG. 1, an embodiment 10 of this invention comprising the sorbent structure with two cable heaters is illustrated in a longitudinal cross-sectional view. A cylindrical perforated plate 1 is provided with an upstream end 3 and a downstream end 5, and an interior face and an exterior face as the skilled person will appreciate. The aforementioned faces are best seen in FIG. 3 as interior face 81 on the leading edge of the flow and the exterior face 79 on the trailing edge of the flow. The downstream end 5 of the perforated plate 1 is typically capped off (not illustrated in FIG. 1), forcing the fluid flowstream entering at the upstream end 3 to make a radial turn. The interior volume bounded by the interior face of the perforated plate 1 is hollow; and the plate comprises a plurality of perforations 7 (e.g., holes and/or flow channels) along and throughout at least a portion of its circumferential and longitudinal (L) dimensions. As seen in FIG. 1, a porous insulating mesh 9 is wrapped circumferentially around the exterior surface of the perforated plate 1. A first heating cable 11 with a first electrical lead 13 is wound in a helical coil around the porous insulating mesh 9, in such as manner as to leave a flow-through spacing between each winding of the helix. Around the first heating cable 11 is wrapped a plurality of layers of mesh sorbent structure 15, for example, an ultra-short-channel-length Microlith® brand mesh, supporting the sorbent 21. A second heating cable 17 with a second electrical lead 19 is wound circumferentially in a helical coil around the mesh sorbent structure 15, again with a spacing between each winding of the helix for fluid flow through. Functionally, the system 10 provides a flow path from the upstream end 3 through the hollow interior of the perforated plate 1, thence through the perforations 7 and subsequently through the porous insulating material 9, the spaces 23 between the helical first heating cable 11, the porous mesh sorbent structure 15 containing sorbent 21, the spaces 25 between the second heating cable 17, and thereafter through an outlet pathway (not shown) from the system.

FIG. 2 depicts another embodiment 20 of the adsorbent system of this invention in a longitudinal cross-sectional view. Embodiment 20 depicts two sections of coiled mesh and three electrical heating cables, alternatingly disposed. A cylindrical perforated plate 31 is provided with an upstream end 33 and a downstream end 35, the downstream end is capped to block flow. The perforated plate 31 comprises an interior face on the leading edge of flow and an exterior face on the trailing edge of the flow, as best seen in FIG. 3 (81/79). The plate comprises a plurality of perforations disposed circumferentially and along the length of the plate 31 in a manner like that illustrated in FIG. 1 (7). The interior face of perforated plate 31 defines a hollow volume. Optionally, a porous insulating layer can be circumferentially wrapped around the exterior of the perforated plate 31, but this is not shown in FIG. 2. A first heating cable 41 is wound in a helical coil around perforated plate 31, the first heating cable provided with an electrical lead (not shown) and wound with spacings between turns of the helix to allow for flow there through. Around the first heating cable 41 are wrapped a plurality of layers of a first mesh sorbent structure 45 coated with sorbent. A second heating cable 51 with an electrical lead 49 is wound circumferentially in a helical coil around the first mesh sorbent structure 45, also allowing for spacings to provide for flow there through. Around the second heating cable 51 is wrapped a second mesh sorbent structure 53. Lastly, a third heating cable 47 is wound in a helical fashion around the second mesh sorbent structure 53, the third heating cable provided with an electrical lead (not shown) and similar spacings to allow for flow there through. The mesh sorbent structures and heating cables described hereinabove are enclosed within a housing 55, which has at its downstream end a system outlet 57. Within the housing 55, two conical flow distributors 59 and 61 are disposed within an outlet flowpath 63. Flow distributor 59 functions to diminish pressure drop by slowly expanding the flowstream passing through the outer heating cable 47 into the outlet pathway 63. Flow distributor 61 functions to guide the flowstream smoothly from the larger diameter outlet pathway 63 to the smaller diameter system outlet 57. Functionally, system 20 provides a flow path from the upstream inlet end 33 of the perforated plate 31 through the hollow interior of the plate 31, thence through the plate's perforations and through the spaces between the first heating cable 41; thence through the first mesh sorbent structure 45, through the spaces between the second heating cable 51, through the second mesh sorbent structure 53; thence the spaces between the third heating cable 47, and thereafter through conical flow distributors 59 and 61, exiting though outlet pathway 63 and outlet 57.

FIG. 3 illustrates an isometric longitudinal view of an embodiment of the cylindrical perforated plate 30 with additional flow constrictors, having an upstream end 3 and a downstream end 5. The perforated plate 30 comprises an upstream section 71 and a downstream section 73, as well as an interior surface 81, an exterior surface 79, and a plurality of perforations 7. Generally, each section is about one-half the full-length L of the plate 30, but a different segmentation of the perforated plate 30 is also acceptable. A plurality of non-perforated bands of material 77, here the plurality numbers thirteen, are disposed uniformly along the downstream section 73 of plate 30 in between sections of perforated plate 75. The non-perforated bands 77 function to restrict the flow along the downstream section 73 and force more flow to the upstream section 71 of plate 30, which in the absence of the non-perforated bands 77 would otherwise be at least partially bypassed. The net effect is to equalize the flow distribution along the entire length L of plate 30.

The perforated plate is constructed of any material durable under the intended chemical exposure and temperatures of operation. Stainless steel is suitably employed in most circumstances. Other non-limiting examples of suitable materials include porous ceramics (e.g., alumina, silica, zirconia, or mixtures and compounds of these); iron, steel, iron- and nickel-based alloys, copper, aluminum, zinc, titanium, brass, bronze, including mixtures and compounds thereof, as well as plastics and polymers including, for example, polyethylene (PE), polypropylene (PP), poly(tetrafluoro)ethylene (PTFE), polycarbonate, and the like. The perforated plate is suitably manufactured by screen printing or 3D-printing, or is additively manufactured, or formed by casting, molding, or drilled mechanically or with a water jet or laser cut. Typically, the perforated plate is provided in a cylindrical configuration with a defined upstream end where fluid flow enters, a downstream end typically capped or provided with a flow restrictor both functioning in a fashion so that the majority of the flow is forced to exit through the plate's perforations; an interior face on the leading edge of the fluid flow, and an exterior face at the trailing edge of the fluid flow. The interior face circumscribes an essentially hollow interior volume that provides a flow path for the entering fluid flowstream containing the target compound. At its upstream end, the plate is adapted with a conventional inlet port, such as a flow meter, standard flow valve, pump, blower or other positive pressure flow inducing device, for feeding the incoming fluid flowstream at a desired flowrate. At its downstream end, the plate is typically closed off forcing the fluid flowstream through the perforations in the plate.

A plurality of perforations is distributed along the plate from its upstream end to its downstream end and generally circumferentially as well; the perforations extending from the inner surface to the exterior surface of the plate so as to form channels passing there through. These perforations may vary in diameter and distribution along the plate. In one embodiment, the diameter of the perforations is uniform from the upstream end to the downstream end of the perforated plate, as well as being distributed uniformly circumferentially throughout the plate. In another embodiment, the diameter of the perforations is non-uniform in that the diameter at the upstream end is greater than or lesser than the diameter at the downstream end, with either a linear or non-linear variation in diameter from one end to the other. In another embodiment, perforations of a larger diameter range are distributed along the plate from its upstream end to about the midpoint of the plate; while perforations of a relatively smaller diameter range are distributed along the plate from about its midpoint to the downstream end of the plate. This decreasing diameter allows for more flowstream pass-through at the upstream end, i.e., less bypass of the flowstream at the upstream end and less amassing of the flowstream at the downstream end of the plate, thereby distributing the flow more evenly along the plate. Typically, the perforations have a diameter ranging between about 0.01 mm and about 5.0 mm. Perforations, measured as a fraction of the area occupied in the plate, can occupy from 1 percent to 99 percent of the plate area; preferably, from about 20 percent to about 60 percent of the plate area; and more preferably, from about 35 percent to about 45 percent of the plate area.

In another embodiment, the diameter of the perforations is uniformly equal along the plate, but at least one band of non-perforated material acting as a flow constrictor is disposed along the lower half of the plate. These non-perforated band(s) can be constructed of the same material as that of the perforated plate or some other material suitable for the intended temperatures and chemical environment. Blocking a portion of the downstream perforations with a foil wrap is equally effective. The number of non-perforated bands provided depends upon design and scale. Typically, the non-perforated band has a width from about ¼ to about ½ of a width of a perforated section; and such sections of perforated section and non-perforated band are alternatingly disposed along the lower half of the perforated plate. Accordingly, in this embodiment roughly 25 percent to about 50 percent of the flow is blocked along the lower end of the plate, so as to distribute more uniformly the flow of sorbate along the mesh sorbent structure.

The mesh sorbent structure comprises a reticulated net or screen, that is, a substantially two-dimensional lattice wherein a thickness dimension is substantially smaller than length and width dimensions, and wherein the lattice contains a regular or irregular array of short pores and channels. In terms of materials of construction, the mesh is suitably selected from metal meshes, ceramic meshes, cermet meshes, and combinations thereof. In this invention, the mesh is not limited to those having acceptable electrical conductivity, inasmuch as the mesh itself is not resistively heated. Rather, it is important that the mesh possess an acceptable measure of thermal conductivity so as to heat up and cool down in a reasonable timeframe, as dictated by the temperature and desired timing of adsorption and desorption cycles. The mesh is not limited by any method of manufacture; for example, meshes can be constructed via weaving or welding fibers, or by an expanded metal technique as disclosed in U.S. Pat. No. 6,156,444, incorporated herein by reference, or by 3-D printing, or by a lost polymer skeleton method. The skilled person will appreciate that the mesh should have acceptable flexibility so as not to crack, break, split, or otherwise lose structural integrity when wrapped around the perforated plate during construction or thereafter of the adsorbent system of this invention.

If the mesh sorbent structure is selected from metallic materials, suitable non-limiting materials include iron-chromium alloys, iron-chromium-aluminum alloys, and iron-chromium-nickel alloys. Such metal meshes are available commercially, for example, from Alpha Aesar and Petro Wire & Steel. In one embodiment, the metal mesh comprises a Microlith® brand metal mesh obtainable from Precision Combustion, Inc., of North Haven, Connecticut, USA. If the mesh is selected from non-metallic materials, suitable meshes include ceramics, where the term "ceramic" refers to inorganic non-metallic solid materials with a prevalent covalent bond, including but not limited to metallic oxides, such as oxides of aluminum, silicon, magnesium, zirconium, titanium, niobium, and chromium, as well as zeolites and titanates. Reference is made to U.S. Pat. Nos. 6,328,936 and 7,141,092, detailing layers of short channel ceramic mesh comprising woven silica, both patents incorporated herein by reference. As a third option, the mesh can be selected from cermets, the term "cermet" referring to a composite material comprising a ceramic and metal, the composite being typically thermally conductive, durable at operating temperatures, and resistant to corrosion and abrasion in a manner similar to ceramic materials.

Typically, the mesh sorbent structure is configured with a plurality of channels or pores of a diameter ranging from about 0.25 millimeters (mm) to about 1.0 mm, with a void space greater than about 60 percent, preferably up to about 80 percent or more. A ratio of channel length to diameter is generally less than about 2:1, preferably less than about 1:1, and more preferably, less than about 0.5:1. Preferably, the mesh has a cell density ranging from about 100 to about 1,000 cells or flow paths per square centimeter.

As described in U.S. Pat. Nos. 5,051,241 and 6,156,444, incorporated herein by reference, Microlith® brand mesh technology offers a unique design combining an ultra-short-channel-length with low thermal mass in one monolith, which contrasts with prior art monoliths having substantially longer channel lengths as noted hereinabove. For the purposes of this invention, the term "ultra-short-channel-length" refers to a channel length in a range from about 25 microns (μm) (0.001 inch) to about 500 μm (0.02 inch). In contrast, the tem' "long channels" pertaining to prior art monoliths refers to channel lengths greater than about 5 mm (0.20 inch) upwards of 127 mm (5 inches).

The loading of the sorbent onto the mesh sorbent structure is described in units of weight sorbent per unit volume of mesh sorbent structure; and this advantageously ranges in one embodiment from about 50 mg sorbent per cubic centimeter mesh sorbent structure (50 mg/cm$^3$) to about 1,500 mg/cm$^3$. In another embodiment, the loading ranges from about 100 mg/cm$^3$ to about 750 mg/cm$^3$. This description takes gross dimensions of the sorbent structure into account. The thickness and uniformity of the sorbent coating on the sorbent structure vary depending upon the specific sorbent structure, sorbent, and coating method selected.

At least one layer of aforementioned mesh sorbent structure is wrapped around the perforated plate. Typically, a plurality of layers of mesh sorbent structure are wound around the perforated plate so as to increase the quantity of sorbent accessible to the fluid flowstream containing the target compound. The number of layers of mesh sorbent structure wound around the perforated plate is typically greater than about 3, preferably, greater than about 10. The number of layers of mesh sorbent structure wound around the perforated plate is typically less than about 100, preferably, less than about 65. It is particularly important to recognize that even in the instance wherein the mesh is metallic, there is no requirement for a layer of insulating material to be intercalated between adjacent layers of mesh sorbent structure, because the heating functionality is now provided by the separate electrical resistive heater component.

The sorbent supported on the mesh sorbent structure varies depending upon the particular target compound(s) desired to be removed from the flowstream. A wide variety of sorbents are known in the art, including various forms of carbon, including graphite, amorphous porous carbons, activated carbons, carbon nanotubes, graphene, graphene oxide, and chemically-modified variations thereof including acid, base, amine, amide, and metal oxide and metal salt treated carbons. Other known sorbents include zeolites, molecular sieves, microporous crystalline materials (MCM's), and metal-organic frameworks (MOF's), and similar various chemically-modified variations thereof, including in one particular embodiment, acid, lithium, sodium, potassium, barium, or strontium modified versions of molecular sieves, and mixtures of such modified embodiments. Chemically-modified graphene is particularly useful for adsorbing volatile organic compounds, such as formaldehyde. Metal oxide, metal salt or acid modified graphene oxide is particularly useful for adsorbing ammonia. For adsorbing carbon dioxide, the literature reports activated carbons, zeolites, supported ionic liquids, and a large number of MOF's of different chemical compositions and structures, as reviewed by M. Mohamedali, D. Nath, J. Ibrahim and M. Henni, in "Review of Recent Developments in $CO_2$ Capture Using Solid Materials: Metal Organic Frameworks (MOFs)", IntechOpen, Chapter 6, 2016, http://dx.doi.org/10.5772/62275. Any of the aforementioned sorbents and others known in the art is suitably employed in this invention. Methods of coating sorbents, or adding sorbents onto porous substrates and onto mesh supports are also known and described in the art.

The electrical resistance heater comprises any structure or device capable of providing heat to the mesh sorbent structure(s) and accompanying sorbent via resistance heating. The heat may be provided through radiative, convective, or conductive heat transfer modes, or a combination thereof. Such electrical resistance heaters include, for example, a heating cable or a formed strip heater. The heater is disposed in thermal communication with the one or more sorbent structures so as to facilitate heat transfer without undue heat loss or waste. Functionally, the heater provides the heat required to release the adsorbed sorbate (or target compound) and regenerate the sorbent.

In one embodiment, the electrical resistance heater comprises at least one heating cable capable of providing resistance heating, selected from any of such conventional and commercial heating cables as are available, for example, through Galaxy Wire and Cable, Inc. and Omega Engineering, Inc. Such cables are sold with particular ranges of power or heat output. The skilled person will appreciate that the heat output selected depends upon the scale of the sorbent system, the scale (e.g., length, thickness) of the mesh sorbent structure in particular, and the temperatures needed to achieve adsorption and desorption of the sorbate. Functionally, the heating cable or cables, as the case may be, provide heat to the mesh sorbent structure thereby releasing the adsorbed sorbate and regenerating the sorbent structure. Accordingly, the one or more heating cables are disposed in thermal communication with the mesh sorbent structure. Typically, one heating cable, hereinafter referenced as the "Outer Heater", is wound in a helical configuration around the outer-most layer of the mesh sorbent structure. In another embodiment, a second heating cable, referenced as the "Inner Heater", is wound in helical fashion around the outer face of the perforated plate, in between the perforated plate and the inner-most layer of the mesh sorbent structure. In yet another embodiment, layers of heating cable and mesh sorbent structure are alternatingly disposed around the perforated plate, so as to comprise an Outer Heater, an Inner Heater, and one or more internal heaters, for example, a Mid-Bed Heater located between two central layers of mesh sorbent structure.

The skilled person will appreciate that in order to reduce heat losses from the heating cable to the perforated plate, in one embodiment a porous insulating material is disposed around the perforated plate in between the perforated plate and the first layer of mesh sorbent structure or in between the perforated plate and the Inner Heater, as the case may be. Likewise, when the mesh sorbent structure is metallic, the electrical resistance heating cable should be insulated from the sorbent structure, either by means of an insulating sheath over the cable or by inserting an insulating material between the heating cable and the mesh sorbent structure. Suitable porous insulating materials, if employed, comprise any electrically non-conductive material with sufficient porosity to pass through the flowstream. Suitable non-limiting examples of such materials include porous aluminas, silicas, zirconia, titania, wool, cotton, polymeric materials, and mixtures of these, which are typically provided in a sheet, layer, or woven fiberglass. The porosity of such materials may consist of any array of micropores, mesopores, or macropores, as known to the skilled person, so long as the flowstream is capable of passing through the insulating material without undue pressure drop or entrapment of any flowstream component. In one embodiment, the insulating material is also disposed on the outside of the outermost layer component of the adsorbent system, so as to protect the system's housing from thermal energy.

The housing, flowstream inlet, flowstream outlet, and flow distributors complete the system structure, these being conventional in design.

The regenerable adsorbent system of this invention is useful for removing a target compound from a fluid flowstream, including a gaseous flowstream or a liquid flowstream, as may be found in a wide variety of applications. In one embodiment, the fluid flowstream comprises a stream of air containing one or more art-recognized contaminants or hazardous and noxious chemicals, for example, a volatile organic compound (VOC), e.g., formaldehyde, which may be produced during human respiration or outgassing of building and construction materials. Such contaminated airstreams occur in enclosed cabin spaces, such as in airplanes, submarines and spacecrafts, as well as in terrestrial residential and commercial buildings. In another embodiment, the fluid flowstream comprises air or any industrial exhaust stream that contains ammonia ($NH_3$). Such $NH_3$-containing streams occur in enclosed human-occupied areas, such as a submarine or space ship, and more ubiquitously are found on poultry, hog, and closed-animal feed operating farms. In yet another embodiment, the flowstream comprises air containing carbon dioxide ($CO_2$) or a combustion stream containing $CO_2$ emanating from any residential or commercial combustion process.

More to the point, in one embodiment, the gaseous flowstream comprises at least one VOC and at least one other gaseous component preferably selected from nitrogen, oxygen, air, carbon monoxide, carbon dioxide, water, and mixtures thereof. The VOC is defined generally as any compound comprising at least carbon and hydrogen atoms and having a measureable vapor pressure. In another embodiment, the gaseous flowstream comprises ammonia and at least one other gaseous component preferably selected from nitrogen, oxygen, air, carbon monoxide, carbon dioxide, water, and mixtures thereof. In yet another embodiment, the gaseous flowstream comprises carbon dioxide and at least one other gaseous component selected from nitrogen, water and mixtures thereof. The concentration of the target compound in the gaseous flowstream depends upon its source and each target compound's partial pressure therein. Generally, ammonia and any VOC present in the flowstream are each independently present in a concentration ranging from several parts per billion by volume ($ppb_v$) to many thousands of parts per million by volume ($ppm_v$). In one embodiment, ammonia is present as a contaminant in the flowstream in a concentration ranging from greater than about 0.1 $ppm_v$ (100 $pp_v$) to less than about 10,000 $ppm_v$. In another embodiment, ammonia is present in the flowstream in a concentration ranging from about 10 $ppm_v$ to about 100 $ppm_v$. It is noted that the National Aeronautics and Space Administration (NASA) specifies a permissible Spacecraft Maximum Allowable Concentration (SMAC) of ammonia during an extravehicular activity (EVA) space mission as only 20 $ppm_v$. In another embodiment, each VOC is present as a contaminant in the flowstream in a concentration ranging from about 0.1 $ppm_v$ to about 10,000 $ppm_v$. In another embodiment, formaldehyde, if present, is present as a contaminant in the flowstream in a concentration ranging from about 0.1 $ppm_v$ to about 10 $ppm_v$. It is noted that NASA specifies a permissible SMAC of formaldehyde during an EVA space mission as only 0.5 $ppm_v$.

The volatile organic compound (VOC) may be classified as either polar or non-polar. For purposes of this invention, the term "polar" refers to a chemical compound having a dipole moment of at least about 0.8 Debye (≥0.8 D); whereas the term "non-polar" refers to a chemical compound having a weak dipole moment or no dipole moment, specifically, a dipole moment less than 0.8 D including as low as 0 D. As known in the art, dipole moment is a measure of electrical polarity of a system of electrical charges. Atoms that provide a dipole moment to a volatile organic compound include, but are not limited to, oxygen, nitrogen, halogen, and sulfur. Suitable non-limiting examples of oxygen-containing substituents imparting a dipole moment to the VOC include hydroxyl, epoxy, acyl, keto, and carboxyl. Suitable non-limiting examples of nitrogen-containing substituents imparting a dipole moment include amine and amide. Suitable non-limiting examples of halogen-containing substituents imparting a dipole moment include fluorine, chlorine, bromine, and iodine; and suitable non-limiting examples of sulfur-containing substituents imparting a dipole moment include thiol, sulfite, sulfate, and thionyl. Purely organic substituents consisting of hydrogen and carbon atoms can also provide a dipole moment to the volatile organic compound depending upon position(s) and number of organic substituent(s), such organic substituents including but not limited to methyl, ethyl, propyl, and higher homologues thereof.

In one exemplary embodiment, the volatile organic compound is a polar compound having a dipole moment of at least about 1.5 D. In another exemplary embodiment, the volatile organic compound is a polar compound having a dipole moment of at least about 2.0 D. In yet another exemplary embodiment, the volatile organic compound is a polar compound having a dipole moment of at least about 2.5 D. At the upper limit the polar VOC typically has a dipole moment less than about 15 D.

The volatile organic compound in one exemplary embodiment comprises an odoriferous compound or an irritant, for example, an irritant towards skin and/or eyes. In another embodiment the volatile organic compound comprises a pollutant or contaminant, which we define as a chemical compound that is classified as noxious, hazardous or otherwise harmful to humans in a concentration greater than an established threshold level. Reference is made herein to the "Toxic and Hazardous Substances" List, Table Z-1, of the Occupational Safety and Health Standards, distributed by the Occupational Safety and Health Administration (OSHA), where the skilled person finds a list of contaminants and pollutants, many of them classifying as polar VOC's, along with their maximum allowable concentration in air. Reference is also made to the "Priority Pollutant List" distributed by the Environmental Protection Agency of the United States, wherein over 126 pollutants are identified. Among these lists are found various non-limiting examples of VOC's including acetaldehyde, acetic acid, acetone, acetonitrile, acrolein, acrylamide, acrylonitrile, allyl alcohol, allyl chloride, aminoethanol, aniline, benzyl chloride, butane thiol, butyl alcohol, butyl amine, chloroacetaldehyde, chlorobenzene, chloroform, cyclohexanol, dichlorobenzene, dichloromethane, dimethylamine, dihydroxymethane, dioxane, ethanol, ethanethiol, ethyl acetate, ethylamine, formaldehyde, formic acid, furan, methanol, methyl mercaptan, methyl acetate, methyl acrylate, methyl bromide, methyl ethyl ketone, phenol, propylene oxide, tetrahydrofuran, and vinyl chloride. It should be appreciated that certain VOC's may be classified into several of the aforementioned categories; for example, an odoriferous VOC or irritant may also be classified as a pollutant or hazardous material. Additionally, it should be appreciated that in another embodiment the gaseous flowstream comprises a mixture of such VOC's.

In another exemplary embodiment the volatile organic compound is selected from the group consisting of $C_{1-8}$ oxy-substituted hydrocarbons and $C_{1-8}$ halocarbons and mixtures thereof. Preferred non-limiting examples of $C_{1-8}$ oxy-substituted hydrocarbons include $C_{1-8}$ aldehydes, ketones, epoxides, alcohols, carboxylic acids, and mixtures of the aforementioned compounds having from 1 to 8 carbon atoms. In another embodiment, the volatile organic compound is a $C_{1-8}$ aldehyde or a mixture of $C_{1-8}$ aldehydes, illustrative species of which include formaldehyde, propionaldehyde, and butyraldehyde. In yet another preferred embodiment, the volatile organic compound is formaldehyde. Suitable non-limiting examples of $C_{1-8}$ halocarbons include $C_{1-8}$ chlorocarbons, such as carbon tetrachloride, $C_{1-8}$ hydrochlorocarbons, such as methylene dichloride, and $C_{1-8}$ fluorochlorocarbons, such as fluorotrichloromethane.

The process of this invention generally involves feeding the fluid flowstream containing the one or more target compounds into the regenerable adsorbent system of this invention, specifically into the interior plenum defined by the perforated plate, wherein the flowstream passes through the perforations and is contacted with the sorbent supported on the mesh sorbent structure and wherein the one or more target compounds are adsorbed. The resulting purified flowstream comprising a substantially reduced concentration of the one or more target compounds is then exhausted through the outlet pathway from the adsorbent system into the surrounding indoor or outdoor environment, as applicable. When the sorbent reaches saturation or nearly saturated capacity, the flowstream is stopped, and the electrical resistance heater is employed to heat the mesh sorbent structure to a temperature sufficient to desorb the adsorbed target compound(s) and thereby regenerate the sorbent. The desorbed target compound(s) is exhausted from the system and captured in a sequestration area or used in a downstream subsequent process. The regenerated sorbent is then subjected to another round of adsorption, and cycling between adsorption and desorption is continued.

The skilled persons will appreciate that the process conditions for adsorption and desorption will depend upon the particular sorbent, fluid flowstream composition, and target compound selected. The following process conditions are presented for guidance purposes; other process conditions may be operable and desirable. The adsorption cycle typically operates at a sorbent temperature ranging from about 0° C. to about 50° C. and a system pressure ranging from less than 1 atm (101 kPa) to about 5 atm (506 kPa). The desorption cycle operates typically at a sorbent temperature ranging from about 38° C. to about 500° C. or a system pressure ranging from about 0.0002 atm (0.02 kPa) to about 1 atm (101 kPa), or at some combination of similar temperature and pressure.

Example

An embodiment of the regenerable adsorbent system of this invention was constructed as shown in FIG. 1, with the exception that the perforated plate 7 was also fitted with non-perforated bands along its downstream half section in the manner illustrated in FIG. 3. The perforated plate (FIG. 3/30) was constructed of stainless steel, of dimensions 12 inches (30.5 cm) length and 2 inches (5.08 cm) diameter. The perforations 7 (⅛ inch, or 3.1 mm dia.) were uniformly distributed throughout the plate. Thirteen bands of metal foil (0.188 in) (FIG. 3/77), functioning as non-perforated bands, were interspersed at equal lengths along the downstream half of the perforated plate 30 so as to reduce the flow in the lower half section of the plate. Referring again to FIG. 1, a porous insulating layer 9 (fiberglass) was disposed around the exterior face of the perforated plate 1. One heating cable 11 (Max 3 kW @ 240V manufactured by Watlow Electric Manufacturing Co., St. Louis, Mo.) was disposed around the insulating layer 9. The sorbent structure 15 comprising a MICROLITH metal mesh (Precision Combustion, Inc.) was wound around the heating cable 11, for a total of 60 layers of mesh. The sorbent 21 employed was a copper 1,3,5-benzenetricarboxylic acid (Cu-BTC) metal-organic framework (MOF) material capable of adsorbing carbon dioxide from air. A second heating cable 17 was disposed around the outer layer of mesh sorbent structure 15. The adsorbent structure 10 was enclosed in a housing (similar to the housing illustrated in FIG. 2/55) having within its exit pathway two conical flow distributors similar to the depiction of FIG. 2/59/61.

A flowstream of contaminated air containing carbon dioxide ($CO_2$) as the target compound (400 ppm in air) was passed at ambient temperature and pressure through the thusly-constructed regenerable adsorbent system 10 containing the MOF sorbent. The target compound $CO_2$ was adsorbed from the flowstream. When the MOF sorbent was nearly saturated, as evidenced by an unacceptable breakthrough of $CO_2$ into the outlet flow stream, the flowstream of $CO_2$-contaminated air was stopped, and the heating cables were engaged to a level of 48 total volts. The mesh sorbent structure was heated by electrical resistance heating via the heating cables 11 and 17, so as to release the adsorbed carbon dioxide and regenerate the MOF sorbent. A regeneration temperature was required to be maintained between 80° C. and 140° C. The temperature of the mesh sorbent structure was measured with two type-K thermocouples, the first thermocouple located at the $2^{nd}$ layer of mesh wrap and the second thermocouple located at the $30^{th}$ layer of mesh wrap, counting layers outward starting from the mesh sorbent located closest to the perforated plate.

Figure 4:
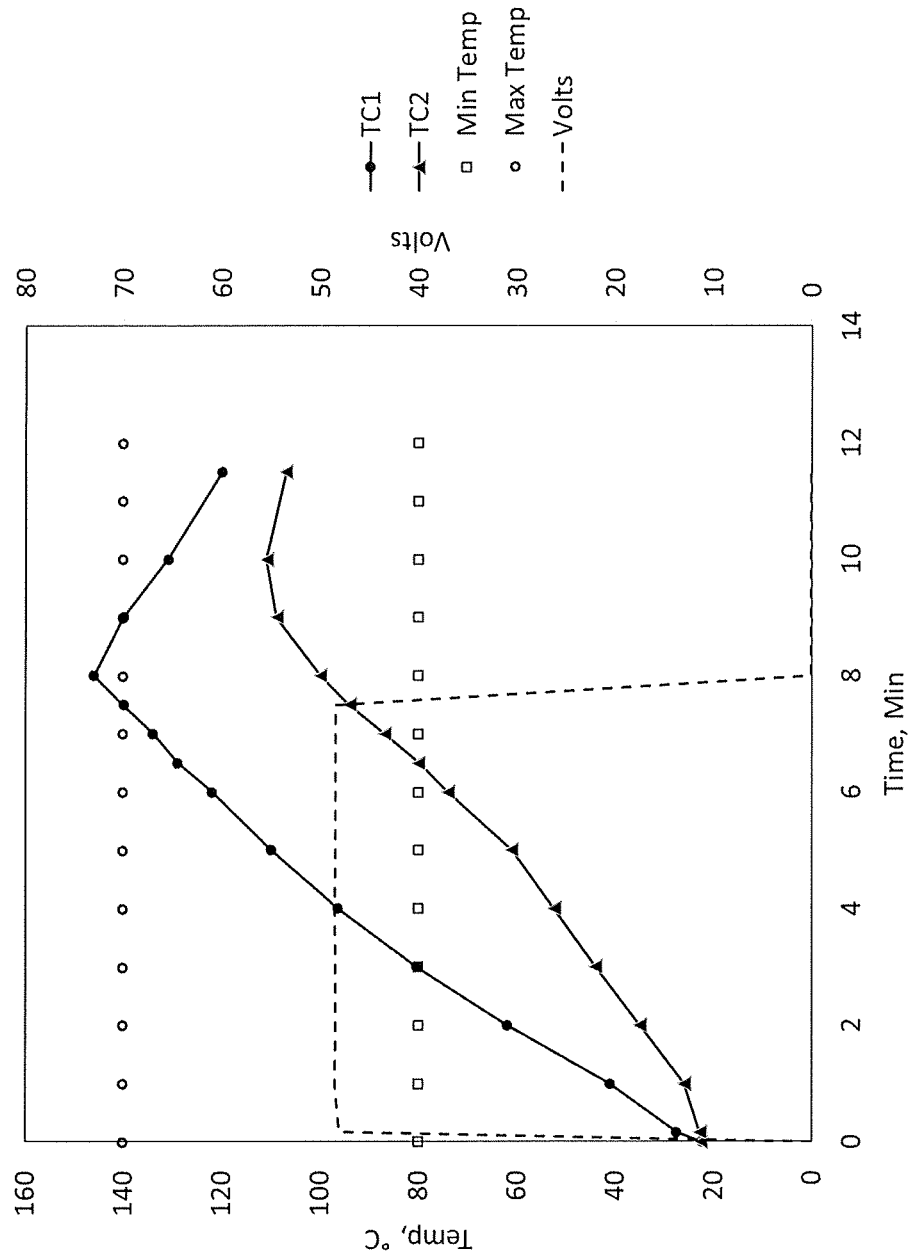
FIG. 4 depicts a graph plotting temperature versus time in a process employing an embodiment of the regenerable adsorbent system of this invention under regeneration operating conditions.

As seen in FIG. 4, the temperature of the thermocouple (TC1) located at the $2^{nd}$ layer of mesh wrap rose to 140° C. in 8 minutes. The temperature of the thermocouple (TC2) located at the $30^{th}$ layer of mesh wrap rose to 100° C. in 8 minutes. When the heating cables were disengaged, the temperatures of the two thermocouples steadily decreased over the next 4 minutes as the mesh sorbent structure cooled.

The experiment illustrates that an apparatus of this invention can be employed to adsorb a target compound from a gaseous flowstream, in this example carbon dioxide from air, and that the sorbent structure can be easily regenerated based on a pre-determined temperature profile.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An adsorbent system for removing a target compound from a fluid flowstream, comprising:
    (a) a non-uniformly perforated plate disposed in a cylindrical configuration comprising an upstream end and a downstream end and further defining an interior face and an exterior face; the interior face enclosing a hollow interior plenum; the non-uniformly perforated plate providing for a greater porosity at the upstream end of the plate as compared with the downstream end of the plate;
    (b) at least one layer of a mesh sorbent structure having a sorbent supported thereon; the at least one layer of the mesh sorbent structure being disposed circumferentially around the exterior face of the perforated plate; and
    (c) a heating cable disposed circumferentially around and in thermal communication with the at least one layer of mesh sorbent structure; the heating cable further being disposed in spaced-apart segments sufficient to provide a flow passage for the fluid flowstream.

2. The adsorbent system of claim 1 wherein the non-uniformly perforated plate further comprises at least one flow constrictor disposed circumferentially and along a longitudinal axis of the perforated plate from its mid-point to the downstream end of the perforated plate.

3. The adsorbent system of claim 2 wherein the flow constrictor comprises at least one non-perforated band of material.

4. The adsorbent system of claim 1 wherein the non-uniformly perforated plate comprises a first plurality of perforations having a first diameter disposed from the upstream end to about the midpoint of the plate and further comprises a second plurality of perforations having a second diameter disposed from about the midpoint to the downstream end of the plate, wherein the first diameter is larger than the second diameter.

5. The adsorbent system of claim 1 wherein the non-uniformly perforated plate comprises a plurality of perforations in decreasing diameter from the upstream end to the downstream end of the perforated plate.

6. The adsorbent system of claim 1 wherein the heating cable is wound in a helical coil around an outer layer of the at least one layer of mesh sorbent structure.

7. The adsorbent system of claim 1 wherein a first heating cable is wound in a helical coil around an outer layer of the at least one layer of mesh sorbent structure; while a second heating cable is wound in a helical coil around the exterior face of the perforated plate, the second heating cable being thereby disposed between the perforated plate and an inner layer of the at least one layer of mesh sorbent structure.

8. The adsorbent system of claim 1 wherein a plurality of heating cables and a plurality of mesh sorbent structures are alternatingly distributed around the exterior face of the perforated plate.

9. The adsorbent system of claim 1 wherein a porous insulating layer is disposed in between the perforated plate and a heating cable adjacent thereto.

10. The adsorbent system of claim 1 wherein the mesh sorbent structure comprises mesh of a metal or ceramic or cermet material having a channel length ranging from 25 microns to 500 microns.

11. The adsorbent system of claim 1 wherein the sorbent is selected from the group consisting of carbons (including graphite, graphene, graphene oxide and acid, base, metal salt and metal oxide modified varieties thereof), zeolites, supported ionic liquids, microporous materials, metal-organic framework materials, and mixtures thereof.

12. The adsorbent system of claim 11 wherein the sorbent comprises a modified graphene, and under operating conditions the absorbent system removes a volatile organic compound from a flowstream comprising air and the volatile organic compound.

13. The adsorbent system of claim 11 wherein the sorbent comprises a modified graphene oxide, and under operating conditions the absorbent system removes ammonia from a flowstream comprising air and ammonia.

14. The adsorbent system of claim 11 wherein the sorbent comprises a metal-organic framework compound, and under operating conditions the adsorbent system removes carbon dioxide from a flowstream comprising air and carbon dioxide or from a flowstream comprising a combustion product containing carbon dioxide.

15. The adsorbent system of claim 1 further comprising a housing comprising an outlet flow path fluidly connecting the spaced part segments of the heating cable with an exterior environment or a sorbate sequestration area.

16. The adsorbent system of claim 15 wherein the outlet flow path comprises at least one flow distributor.

17. A process of regenerably removing a target compound from a fluid flowstream comprising:
(a) providing an adsorbent system comprising the following components:
(a)(i) a non-uniformly perforated plate disposed in a cylindrical configuration comprising an upstream end and a downstream end and further defining an interior face and an exterior face; the interior face enclosing a hollow interior plenum; the non-uniformly perforated plate providing for a greater porosity at the upstream end of the plate as compared with the downstream end of the plate;
(a)(ii) at least one layer of a mesh sorbent structure having a sorbent supported thereon; the at least one layer of the mesh sorbent structure being disposed circumferentially around the exterior face of the perforated plate; and
(a)(iii) a heating cable capable of providing resistance heating disposed circumferentially around and in thermal communication with the at least one layer of mesh sorbent structure; the heating cable being disposed in spaced-apart segments sufficient to provide a flow passage for the flowstream;
(b) initiating a fluid flowstream comprising a target compound into the adsorbent system and contacting the fluid flowstream with the sorbent under process conditions sufficient to remove the target compound from the flowstream;
(c) stopping the fluid flowstream when the sorbent is saturated or substantially saturated with the target compound;
(d) engaging the heating cable to heat the mesh sorbent structure and sorbent, so as to release the target compound and regenerate the sorbent; and
(e) iteratively repeating steps (b) through (d).

18. The process of claim 17 wherein the sorbent comprises a modified graphene, and the process removes a volatile organic compound from a flowstream comprising air and the volatile organic compound.

19. The process of claim 17 wherein the sorbent comprises a modified graphene oxide, and the process removes ammonia from a flowstream comprising air and ammonia.

20. The process of claim 17 wherein the sorbent comprises a metal-organic framework compound, and the process removes carbon dioxide from a flowstream comprising air and carbon dioxide or a flowstream comprising a combustion flowstream containing carbon dioxide.

21. The process of claim 17 wherein the adsorption cycle operates at a sorbent temperature ranging from 0° C. to 50° C. and a system pressure ranging from less than 1 atm (101 kPa) to 5 atm (506 kPa); and wherein the desorption cycle operates at a sorbent temperature ranging from 38° C. to 500° C. or a system pressure ranging from about 0.0002 atm (0.02 kPa) to 1 atm (101 kPa), or a combination thereof.

\* \* \* \* \*